United States Patent [19]

Takashima et al.

[11] Patent Number: 5,777,626

[45] Date of Patent: Jul. 7, 1998

[54] VIDEO IMAGE SPECIAL EFFECT DEVICE

[75] Inventors: Akihiro Takashima; Tetsuro Nakata, both of Kanagawa, Japan

[73] Assignee: Sony Corporation, Tokyo, Japan

[21] Appl. No.: 520,424

[22] Filed: Aug. 29, 1995

[30] Foreign Application Priority Data

Aug. 31, 1994 [JP] Japan ................................. 6-230288

[51] Int. Cl.⁶ ................................................ G06F 15/00
[52] U.S. Cl. ................................................ 345/443
[58] Field of Search ............................. 395/141, 142, 395/143; 345/440, 441, 442, 443

[56] References Cited

U.S. PATENT DOCUMENTS

| 4,712,185 | 12/1987 | Aoki | 395/141 |
| 5,473,740 | 12/1995 | Kasson | 395/134 |
| 5,581,796 | 12/1996 | Koga et al. | 395/134 |

FOREIGN PATENT DOCUMENTS

| 0 213 316 | 3/1987 | European Pat. Off. |
| 2 222 052 | 2/1990 | United Kingdom |
| 2 229 886 | 10/1990 | United Kingdom |
| 2 236 638 | 4/1991 | United Kingdom |

OTHER PUBLICATIONS

Simpson, "Mastering Word Prefect 5.1 95.2 For Windows" pp. 136–137, 1993.

*Primary Examiner*—Phu K. Nguyen
*Attorney, Agent, or Firm*—Frommer Lawrence & Haug LLP; William S. Frommer

[57] ABSTRACT

An image crop circuit performs a crop process for an input video image under the control of a CPU. An image shape changing circuit performs an image shape changing process such a mosaic process for a video signal that is cropped corresponding to a control signal. The image shape changing circuit supplies the video image to a graphic inserter circuit. A GDC that is a graphic dedicated CPU draws a positive region of a contour line of the crop region as a solid line and a negative region as a dotted line. The graphic inserter circuit superimposes the contour line with the video signal that is cropped and outputs the resultant signal to both a CRT monitor and an output terminal.

6 Claims, 4 Drawing Sheets

VIDEO IMAGE SPECIAL EFFECT DEVICE

FIELD OF THE INVENTION

The present invention relates to an image special effect apparatus for storing a video input image in a frame memory and processing data in the frame memory so as to perform such operations as image enlargement, image reduction, image rotation, or the like.

BACKGROUND OF THE INVENTION

A special effect device for designating a desired frame, or image area, with an aspect ratio of 4:3 for a conventional monitor or with an aspect ratio of 16:9 for a high-vision (high definition) type monitor is known. This special effect device performs a process typically referred to as an image crop process. In the crop process only a desired portion, or effective range, of an image is denoted for display while portions of the image which are not within the effective range, or otherwise not desired, are removed (cropped) or otherwise ignored for display purposes. A background image of some type is used to replace that portion of the image which was cropped out, or removed.

The crop process is performed by manipulating a boarder line, called a wireframe. This wireframe can be manipulated via an operator using an input devices, such as, for example, a trackball, rotary or linear control device, or pointing device. The wireframe is manipulated to form a boarder around a desired portion of an image on the display screen which it is desired to have displayed. In other words the wireframe acts to define the image portion which will be displayed on the display monitor, or otherwise saved for further processing.

The position and size of the wire frame, can be manipulated by an operator to designate, or define, an effective range/portion (crop region) of an image which is desired for display. In the conventional systems for cropping an image, the wireframe perimeter can be expanded, contracted or moved up, down or side to side by adjusting the position of the top line, bottom line or side lines which form the wireframe.

In making such adjustments, it is not uncommon for the operator to adjust the solid lines which form the wireframe so that the lines which form the wireframe cross over each other. An example of crossover is when the top line of the wireframe is moved below the bottom line of the wire frame and vice-a-versa or, for example, the right side line is moved so that it is to the left of the left side line, and vis-a-versa. When this occurs, the area defined by the solid wireframe is called a negative region and the desired imagery is not displayed as a result of the cross over of the wireframe.

While the solid line of the wireframe and lack of a displayed image may make it clear to the operator that the wireframe has been crossed over, it is more difficult for the operator to make immediate adjustments to rectify the problem, since the solid line wireframe still appears on the display regardless of whether the wireframe is actually collapsed upon itself or not. As a result an operator of a conventional system can not immediately tell whether adjustments to the top and bottom lines of the wireframe are needed, or whether adjustments are needed to the left and right sides of the wireframe, or both, in order to resume view of the desired image.

SUMMARY OF THE INVENTION

It is, therefore, an object of the present invention to provide an image special effect apparatus for switching the type of a line used to form the wire frame from one type when the wireframe is properly oriented to display a desired image area, to a second type of line when the wireframe has been collapsed upon itself so that corrective actions made be more readily carried out by an operator.

According to an aspect of the invention, there is provided an image special effect apparatus for defining a display range, or portion, of an image necessary for an input video image, which incorporates a generating circuit for generating first and second position data to designate the display range, a means for masking other than the display range of the input video image corresponding to the position data, a generator for generating a boundary line of the display range corresponding to the position data and superimposing the input video image with the boundary line, and a means for switching the type of the boundary line corresponding to the difference between X components and Y components of the first and second position data.

Top, bottom, left, and right absolute address values are calculated. When a crop region is determined as a negative region, the boundary line of the region is represented as a dotted line.

The above, and other, objects, features and advantages of the present invention will become readily apparent from the following detailed description thereof which is to be read in connection with the accompanying drawings.

DETAILED DESCRIPTION OF THE INVENTION

Figure 1:
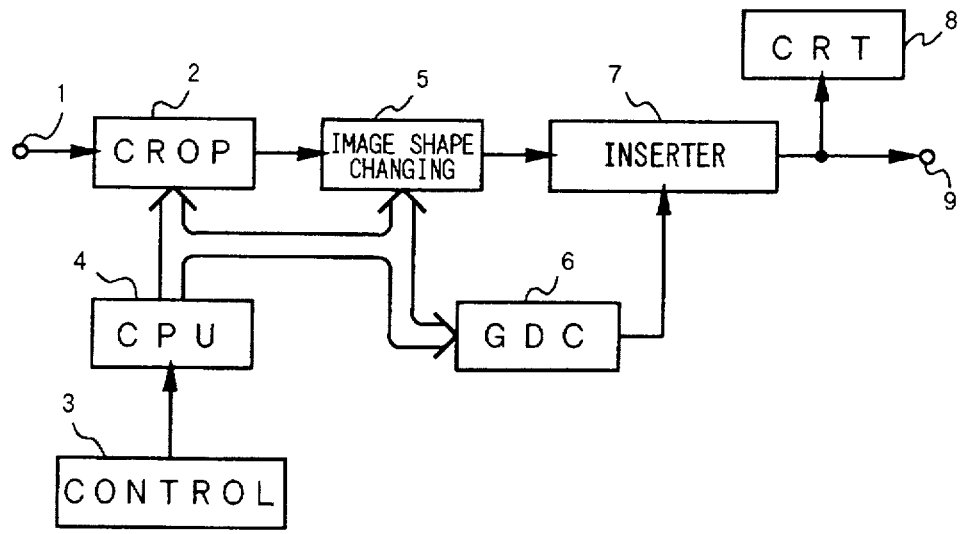
FIG. 1 is a block diagram showing an image spacial effect apparatus according to an embodiment of the present invention.

An embodiment of the present invention will be described with reference to the accompanying drawings. FIG. 1 is a block diagram showing an image special effect apparatus according to an embodiment of the present invention. For example, a digital video signal is input from an input terminal 1. The input digital video signal is supplied to an image crop circuit 2. Special effect data for an image in a crop process of the input digital video signal is selected by a control panel 3, and data needed for the special effect such as crop data is input to a control panel 3. The data expressing the kind of special effect or the data needed for special effect is supplied to a CPU 4. The image special effect apparatus according to this embodiment is controlled by the CPU 4.

The CPU 4 supplies four address values (shown in FIG. 2 and described later) to the image crop circuit 2. The image crop circuit 2 crops only a required region of the input digital video signal (namely, a digital image) corresponding to the absolute address values supplied from the CPU 4. The image shape changing circuit 5 receives the four absolute address values from the CPU 4 and the digital image with the crop region from the image crop circuit 2. The image shape changing circuit 5 performs, for example, a mosaic process, defocus process, sepia process, or the like for the received digital image and supplies the processed image to a graphic inserter circuit 7.

The CPU 4 supplies the four absolute address values to a Graphic Display Controller (hereinafter GDC) 6 that is a graphic dedicated CPU. The GDC 6 generates a wire frame showing a crop region as a designated frame and supplies the generated wire frame to the graphic inserter circuit 7. The graphic inserter circuit 7 superimposes the wire frame with the digital image that is cropped. The digital image superimposed with the wire frame is supplied to both a CRT monitor 8 and an output terminal 9.

Figure 2:
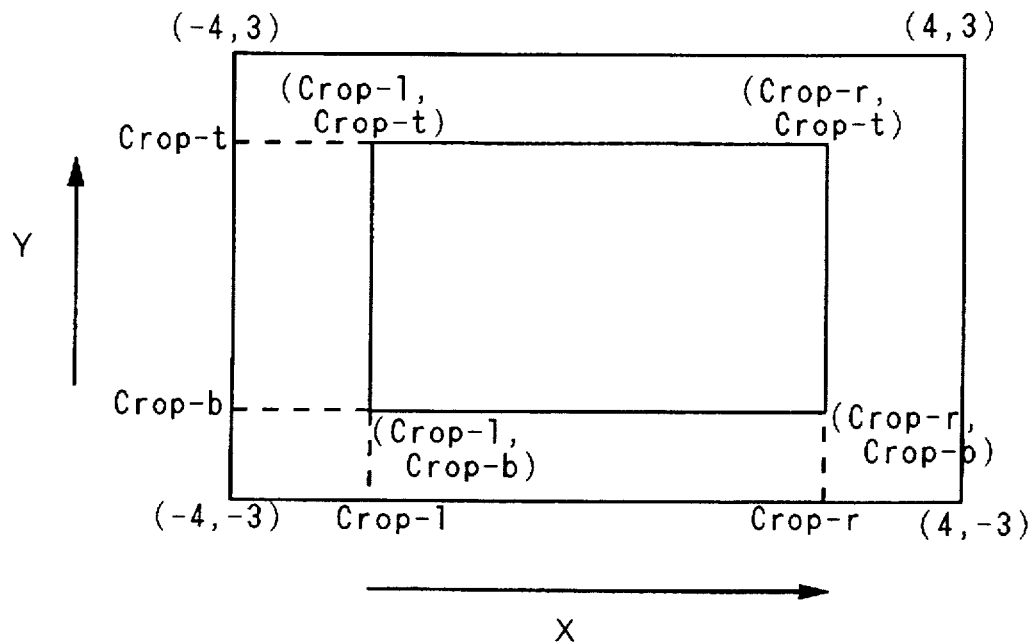
FIG. 2 is a schematic diagram showing an example for explaining absolute address values of a crop region according to the present invention.

Next, with reference to FIG. 2, the four absolute address values that represent the crop region will be described. In this example, the four absolute address values are address values of X axis and Y axis of a screen of the CRT monitor with an aspect ratio of 4:3. It is assumed that the maximum address values at top left, top right, bottom left, and bottom right on the CRT monitor are (−4, 3), (4, 3), (−4,−3), and (4,−3). In addition, it is assumed that the absolute address values that represent the boundary position of the effective range of the image are Crop-t, Crop-b, Crop-l, and Crop-r. These values are referred to as crop values. When the crop values are designated, the effective display range of the image can be varied. When the range of the difference between two crop values in the X direction or the Y direction is positive, it is referred to as a positive region. When the range of the difference between two crop values in the X direction or the Y direction is negative, it is referred to as a negative region.

Lines that connect edge points (Crop-l, Crop- t), (Crop-r, Crop-t), (Crop-r, Crop-b), and (Crop-l, Crop-b) of the effective display range of an image designated by the crop process (namely, lines of the frame of the image that is cropped) are referred to as a wire frame. With the wire frame, the crop range can be clearly represented. Even if there is not a remarkable difference of luminances and hue between the input image and the image of the background, the range of the cropped input image can be clearly represented.

Figure 3A:
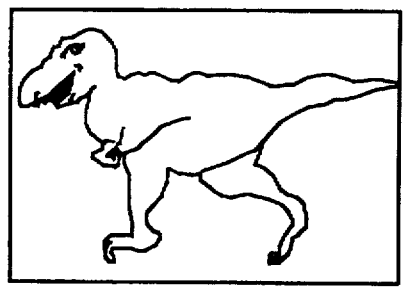
FIG. 3A is a schematic diagram for explaining a crop region according to the present invention.
Figure 3B:
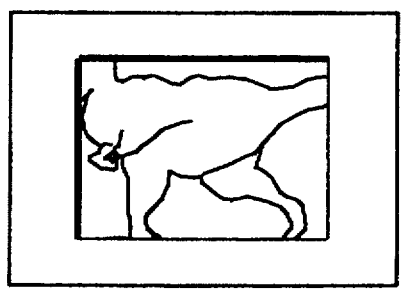
FIG. 3B is a schematic diagram for explaining a crop region according to the present invention.
Figure 3C:
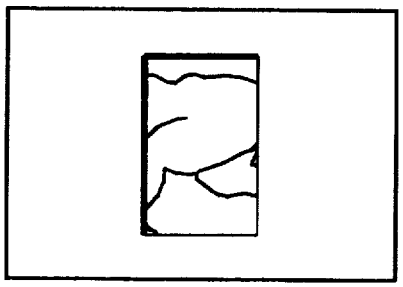
FIG. 3C is a schematic diagram for explaining a crop region according to the present invention.
Figure 3D:
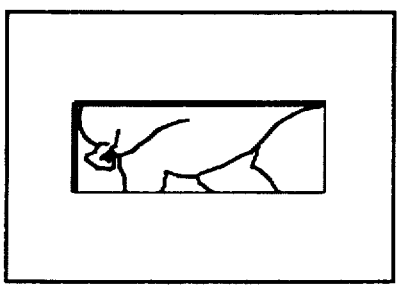
FIG. 3D is a schematic diagram for explaining a crop region according to the present invention.

Next, the relation between the displayed wire frame and the crop value will be described with reference to FIGS. 3A, 3B, 3C and 3D. FIG. 3A shows an image that is not cropped. FIG. 3B shows the case (Crop-t−Crop-b>0 and Crop-r−Crop-l>0) (namely, this shows a wire frame and an crop region surrounded by the wire frame when the crop region is positive). FIGS. 3C and 3D show wire frames and crop regions when the crop regions are positive. FIG. 3C shows a crop region of which the range of left and right is narrower than the crop region shown in FIG. 3B. FIG. 3D shows a crop region of which the range of top and bottom is narrower than the crop region shown in FIG. 3B.

Figure 4A:
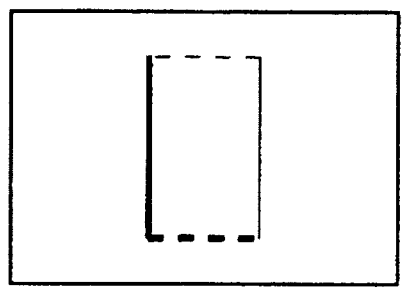
FIG. 4A is a schematic diagrams for explaining a crop region according to the present invention.
Figure 4B:
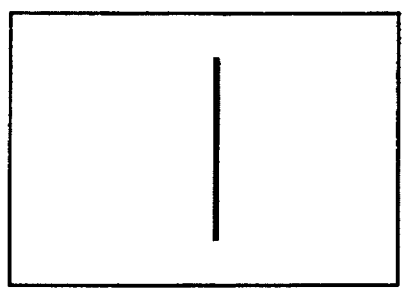
FIG. 4B is a schematic diagrams for explaining a crop region according to the present invention.
Figure 4C:
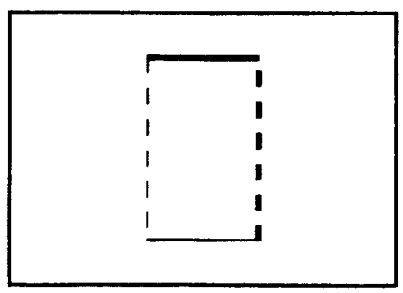
FIG. 4C is a schematic diagrams for explaining a crop region according to the present invention.

Next, the case in which the crop region is negative will be described with FIGS. 4A to 4F. FIG. 4A shows a wire frame (Crop-t−Crop-b<0 and Crop-r−Crop->0). FIG. 4B shows a wire frame (Crop-t−Crop-b>0 and Crop-r−Crop-1=0). In FIG. 4B, when left and right regions overlay, it is meaningless to consider whether the crop region is positive or negative. FIG. 4C shows a wire frame (Crop-t−Crop-b)>0 and Crop-r−Crop-l<0).

Figure 4D:
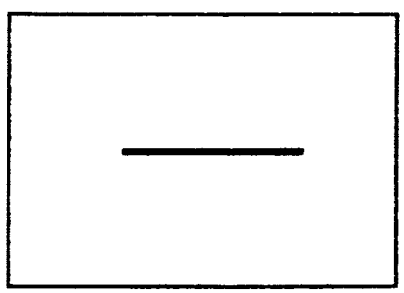
FIG. 4D is a schematic diagrams for explaining a crop region according to the present invention.
Figure 4E:
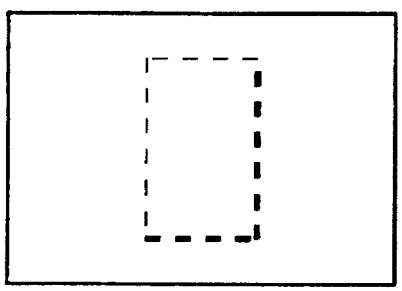
FIG. 4E is a schematic diagrams for explaining a crop region according to the present invention.
Figure 4F:
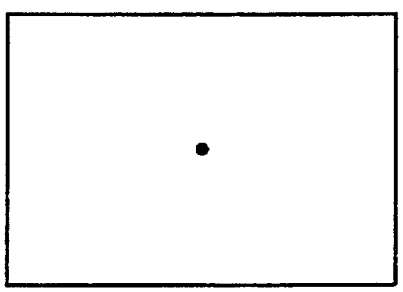
FIG. 4F is a schematic diagrams for explaining a crop region according to the present invention.

FIG. 4D shows a wire frame (Crop-t−Crop-b=0 and Crop-r−Crop-l>0). In FIG. 4D, when top and bottom overlap, it is meaningless to consider whether the crop region is positive or negative. FIG. 4E shows a wire frame (Crop-t−Crop-b<0 and Crop-r−Crop-l<0). FIG. 4F shows a wire frame (Crop-t−Crop -b=0 and Crop-r−Crop-l−0). In this case, since top, bottom, left, and right overlay, the wire frame is represented as a point.

For simplicity, the wire frames in FIGS. 3 and 4 are represented by different sizes of lines as follows.

Positive region Negative region
Crop-t Thick, solid line Thick, dotted line
Crop-b Thin, solid line Thin, dotted line
Crop-l Thick, solid line Thick, dotted line
Crop-r Thin, solid line Thin, dotted line When regions overlay, they are represented in the same manner as the positive regions.

Figure 5:
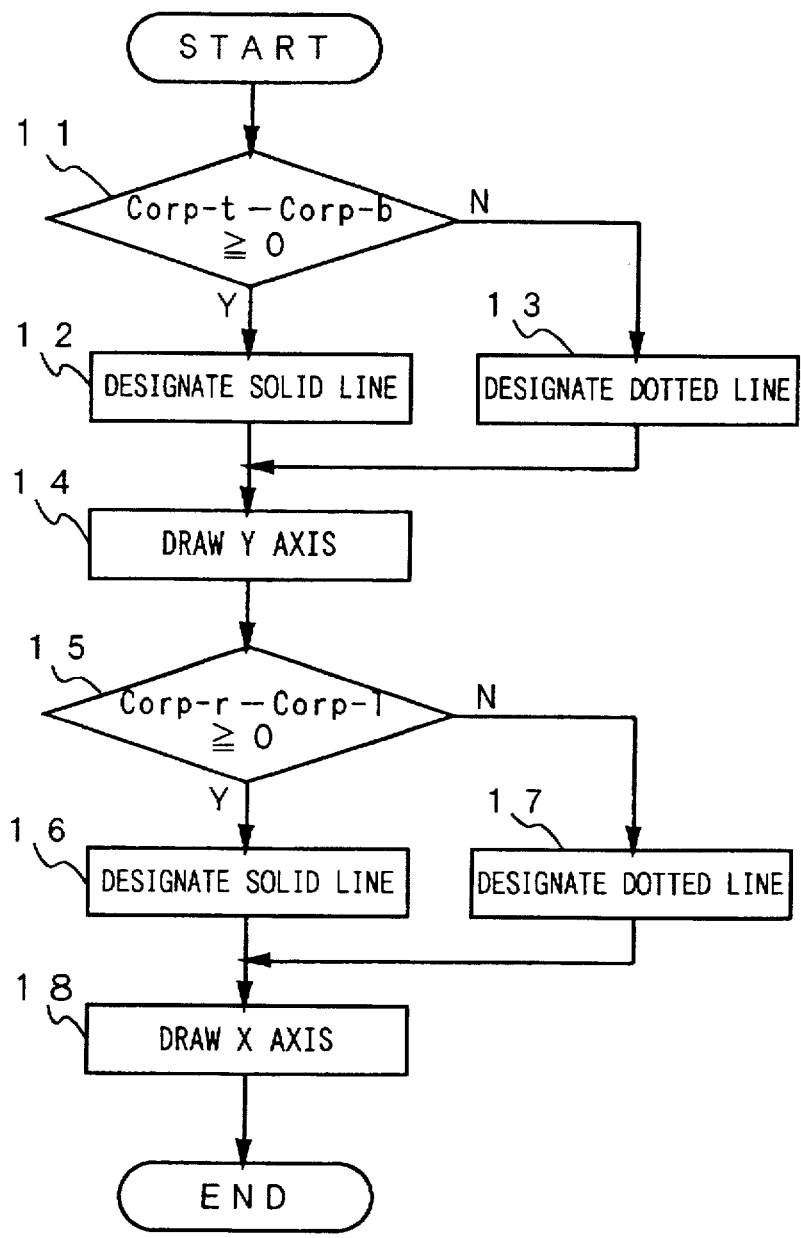
FIG. 5 is a flow chart for drawing a wire frame according to the present invention.

Next, a flow chart of the GDC 6 that draws types of lines of a wire frame will be described with reference to FIG. 5. At step 11 "Crop-t−Crop-b 0", the flow starts. Thus, absolute values (namely, crop values) are supplied. At step 11, it is determined whether the Y axis is a positive region or a negative region. When the Y axis is a positive region, the flow advances to step 12 "designate solid line". At step 12, a solid line is designated. At step 12, the drawing of a solid line of the Y axis of the wire frame is designated.

When the Y axis is a negative region at step 11, the flow advances to step 13 "designate dotted line". At step 13, the drawing of a dotted line of the Y axis is designated. Thereafter, the flow advances to step 14 "drawing Y axis". At step 14, the types of lines of the Y axis designated at steps 12 and 13 are drawn.

At step 15 "Crop-r−Crop-l 0", it is determined whether the X axis is a positive region or a negative region. When the X axis is a positive region at step 15, the flow advances to step 16 "designate solid line". At step 16, the drawing of a solid line of the X axis of the wire frame is designated. When the X axis is a negative region at step 15, the flow advances to step 17 "designate dotted line". At step 17, the drawing of a dotted line of the X axis of the wire frame is drawn.

Thereafter, the flow advances to step 18 "draw X axis". At step 18, the types of lines of the X axis designated at steps 16 and 17 are drawn. Thus, the process of the flow chart is finished.

In this flow chart, the top, bottom, left, and right of the absolute address values (Crop-t, Crop-b, Crop-r, and Crop-l) are calculated. Thus, it is determined whether the Y axis (Crop-r−Crop-b 0) is a positive region or a negative region. Thus, it is determined whether the wire frame is represented by the solid line or the dotted line. In this example, after the line in the Y direction is drawn, the line in the X direction is drawn. However, after the line in the X direction is drawn, the line in the Y direction may be drawn.

When the crop process is performed by the image special effect apparatus, the difference of crop values in the X and Y directions is calculated. When the difference is positive, it is represented by a solid line. When the difference is negative, it is represented by a dotted line. For example, and with reference to FIG. 2, assuming crop-t=2, crop b=−2, crop L=−3 and crop R=3, it can be seen that the difference in crop values of the X direction(crop-L & crop R) is positive, while the difference in crop values in the Y direction (crop t and crop b) is also positive thus the crop region is defined by a solid line wireframe to indicate that it is a positive crop region. In this way the state of the current crop region can be easily distinguished. Consequently, a desired image effect can be easily accomplished.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. An image special effect apparatus for defining a portion of an image displayed on a display device for output as a video image, comprising:

means for generating and superimposing a rectangular wireframe on said display device, said rectangular wireframe enclosing a positive region therein;

operator control means for manipulating the dimensions of said rectangular wireframe;

wherein, said rectangular wireframe comprises four corner points, each defined by respective position data, and connected to one another by a respective connecting line so as to form a rectangle;

wherein, said rectangular wireframe encloses a negative region when said operator control means manipulates the dimensions of said rectangular wireframe such that opposite connecting lines switch sides of said rectangle;

masking circuitry means for masking portions outside said positive region of said image; and control means for controlling said means for generating to draw respective connecting lines as either a first type of line when said respective connecting line does not switch sides or a second type of line, distinct from the first type, when said respective connecting line switches sides.

2. The image special effect apparatus as set forth in claim 1, wherein said control means for controlling said means for generating to draw said respective connecting line as said first type where the difference between respective X-values and Y-values of said corner points connected by said respective connecting line is greater than zero and to draw said respective connecting line as said second type where said difference is less than zero.

3. The image special effect apparatus as set forth in claim 1, wherein said control means for controlling said means for generating to draw said respective connecting line as a solid line where the difference between respective X-values and Y-values of said corner points connected by said respective connecting line is greater than zero and to draw said respective connecting line as a dotted line where said difference is less than zero.

4. The image special effect apparatus according to claim 1, further comprising:

means for changing the shape of the input video image in the display range.

5. A method for performing an image special effect comprising the steps of:

generating a wireframe having four corner points, each defined by respective position data and connected to one another by a respective connecting line so as to form a rectangle enclosing a positive region therein;

manipulating the positions of the respective connecting lines of said rectangle;

calculating the difference between corner points; and drawing said respective connecting line as a first type of line when said difference is greater than zero indicating that said respective connecting line has not switched sides and as a second type of line distinct from the first type when said difference is less than zero indicating that said respective connecting line has switched sides thereby enclosing a negative region therein.

6. A method of performing an image special effect according to claim 5, wherein said first type of line comprises a solid line and said second type of line comprises a dotted line.

* * * * *